UNITED STATES PATENT OFFICE.

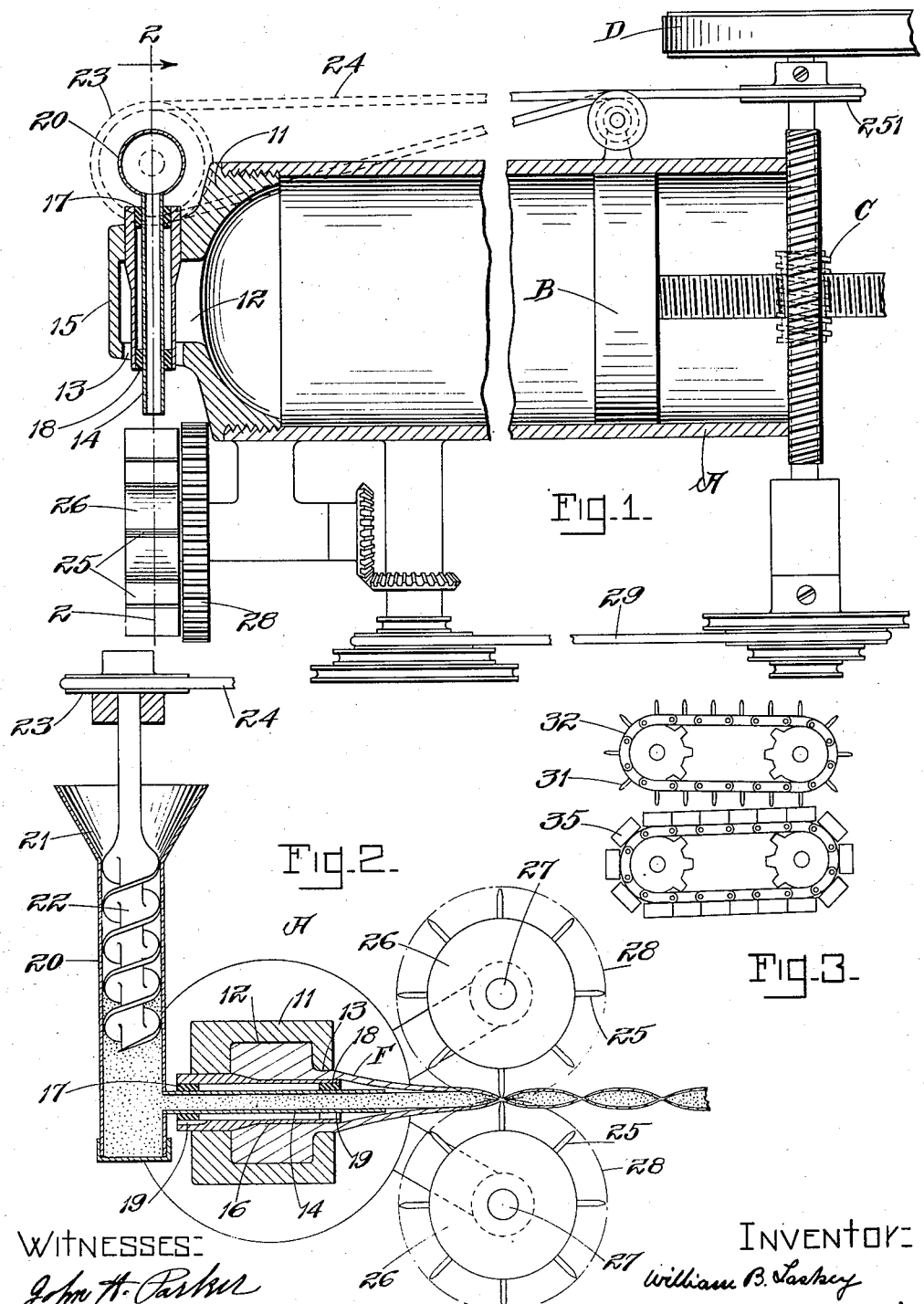

WILLIAM B. LASKEY, OF MARBLEHEAD, MASSACHUSETTS.

CANDY-MAKING MACHINE.

1,242,562. Specification of Letters Patent. Patented Oct. 9, 1917.

Application filed December 28, 1914. Serial No. 879,250.

*To all whom it may concern:*

Be it known that I, WILLIAM B. LASKEY, citizen of the United States, residing at Marblehead, county of Essex, State of Massachusetts, have invented a certain new and useful Improvement in Candy-Making Machines, of which the following is a specification, reference being had therein to the accompanying drawings.

My invention has for its object an improved machine for making candy, in accordance with a novel process forming the subject-matter of a divisional application filed March 16, 1916, Serial No. 84530. The candy made by the hereinafter described machine is of a kind well known to confectioners, and consists of a shell or exterior layer of pulled candy, ordinarily of the kind known as "hard boiled candy" filled with some suitable filling mixture which is ordinarily of a pasty or creamy consistency. One filling of this kind is peanut butter, another filling is a properly compounded mixture of which sugar, or glucose, or sugar and glucose, and flavoring, are the chief ingredients. In the past such candy has been made by rolling the filling material up in a flat sheet of pulled candy, then pulling it down to size, and then cutting it into pieces. Candy so made has been very expensive because its manufacture has been essentially a hand process dependent on the skill of the workman for the production of attractive candy, and its high cost has interfered with its popularity.

The new process described in said divisional application consists essentially in forcing the plastic candy through a die having an annular orifice of a diameter considerably greater than that of the finished piece, then pulling the tube thus produced down to about the required size, and then introducing the filling material through the die to a point in the tube of candy at a distance from the die.

This process and the machine for performing the process make it possible to manufacture candy of this kind by machine continuously and the hands of the workman do not come in contact with the candy at all. The machine is entirely automatic so that the results are practically independent of the skill of the workman.

It is also possible to make candy having a shell much thinner than has heretofore been possible. This is advantageous, because the goods are thereby made more attractive and palatable, and also because the expense is reduced.

In the following specification, I have referred to the exterior layer as the shell, and to it as being tubular in form. I have also referred to the die as annular. I wish to be understood however as including by the word "tubular" all the various forms of cross sections of candy which have a shell within which is contained filling material. This description is also intended to include filled chips, etc. The shell is preferably made of "hard candy" that is, a candy boiled to a relatively high temperature. Such candy is brittle when cold and becomes hard and stiff by a relatively small drop in temperature.

Also, in the following description, I have referred to the fact that the filling material is of a temperature considerably below that of the shell whereby the shell is chilled and partially set when the filling material contacts with it. The shell is made in tubular form by being forced through a die, while at a relatively high temperature its diameter being then larger than that of the finished piece and it is then pulled down to final size. The temperature of the shell when it leaves the die is upward of 100° Fahr. and in practice about 150° Fahr. The temperature of the filling material may be the temperature of the room or possibly slightly above it, resulting from its proximity to the heated candy from which the shell is made. The temperature of the filling is therefore from 65° to 80 or 85°, it being preferable that the filling material be kept at a fairly low temperature by artificial means if necessary. The relatively cold filling material is introduced through the die into the tube of candy but is not permitted to contact with the walls of the shell until at about the point where the shell has been pulled down to its final diameter. This is done because the cold filling chills the shell, and thereafter additional tension does not have the effect of reducing its diameter to that point.

My invention will be fully understood by reference to the following description taken in connection with the accompanying drawings, and the novel features thereof are pointed out and clearly defined in the claims at the close of this specification.

In the drawings, Figure 1 is a horizontal section of a machine embodying my invention.

Fig. 2 is a vertical section on line 2—2 of Fig. 1, looking in the direction of the arrows.

Fig. 3 shows a modification of the pulling and cutting mechanism.

Referring to the drawings, at A is shown a main cylinder and at B the piston operated by a worm and gear C driven by the main driving belt D. The candy from which the shell is made is placed within the cylinder A and is forced under heavy pressure through a nozzle 11 by means of the piston B. The candy from which the shell is made has already been boiled to the proper temperature, partly cooled and pulled in the manner employed in the manufacture of hard candy. At 11 is shown the nozzle, the cylinder head being screwed onto the cylinder A. This nozzle is made of considerable strength to be capable of withstanding the heavy pressure to which the candy is subjected. At 12 is shown a part of the passageway through the nozzle, and at 13 is shown the orifice through which the candy is emitted. This orifice 13 is of any convenient shape. For making candy which is cylindrical in cross section, the orifice will be circular. If the candy is flat, the die will be of corresponding shape. It will be seen that the pressure placed on the candy by the piston B forces the candy out through the orifice 13 in a tubular form. The diameter of this tube is considerably larger than that of the finished piece so that it may be pulled down to give to the surface of the candy the necessary luster or sheen since the candy if not pulled down will have a vitreous appearance, which is less attractive to the purchaser.

As has been stated already, the filling material is introduced into the shell or tube F of candy when it has been partially pulled down. This is done in the following manner:

At 14 is shown the filling nozzle which consists of a tube extending from side to side through the projection 15 on the cylinder head 11. This tube is contained within the tube 16, the exterior of which forms a part of the die or orifice through which the shell is forced. The filling nozzle 14 is preferably insulated as shown at 17 and 18 from the tube 16 and is separated therefrom by an air space so that the heat from the candy will not be communicated to the filling material. One or more air holes 19 are also provided to permit the flow of air into the interior of the tube of candy so that it will not be collapsed by the pressure of the outer air. The filling nozzle 14 communicates with the feed cylinder 20 provided at its upper end with a funnel 21. Within this feed cylinder 20 is some suitable feeding or forcing element 22, as for instance a screw by means of which the filling material is forced downwardly and out through the filling nozzle 14. The screw is conveniently driven by a pulley and belt 23, 24, said belt passing over a pulley 251 on the main shaft. It will be noticed that the filling nozzle 14 projects beyond the orifice 13 for a considerable distance, and that the stream of filling material from the nozzle does not contact with the shell or tube of candy until the candy has passed some little distance out of the orifice. This is an important feature of the invention because the filling material chills the thin tube of hard candy and hardens or sets it somewhat so that it cannot thereafter be pulled down although it is still somewhat plastic. This is no doubt due to the fact that the candy as it emerges from the die is softer than the candy after the filling material has contacted with it and therefore the chilled portion of the candy has sufficient strength or rigidity to resist a pulling strain which is sufficient to elongate the unchilled portion of the candy.

The pulling down is conveniently done by means of traveling cutting and pulling members. In the drawings I have shown a pair of drums 26 each provided with eight blunt-edged members 25. These two drums are mounted on shafts 27, and are geared together by gears 28. One of the shafts 27 is driven from the main shaft of the machine by means of a belt drive 29. The belt drive is preferably made to run at variable speeds so that the drums may be run faster or slower as the case may be. The cutting and pulling members are speeded to have a peripheral speed greater than the speed of the candy as it emerges from the die 13. The pairs of blunt-edged members 25 successively engage the sides of the candy, compress it slightly between them and as they move farther pull out the candy thereby reducing its size and giving it the necessary silky luster. The cutting and pulling members are usually set so that the members composing each set do not quite contact with each other. They therefore only mark the candy at successive intervals. If brought nearer together they will act as cutters. The candy is so brittle when fully cooled that the adjacent pieces fall apart without any additional operation. One series of traveling pulling members and an abutment coöperating therewith is all that is necessary to successful operation of this part of the machine, but of course a second series of traveling pulling members such as is formed by the pulling members on the other drum is the most satisfactory form of abutment to be employed.

The amount of filling material introduced into the tube of candy can be easily regulated by varying the speed of the forcing member 22. If for instance a candy having a very large bulk is desired, that is, a candy of large bulk and small weight, the forcing member will be run very slowly so that the shell will be only partly filled with the filling material. On the other hand, and under ordinary conditions, the forcing member will be run at a speed just sufficient to completely fill the shell. The action of the cutting and pulling members pinches together the ends of the shell of each piece while the candy is still in somewhat plastic condition and therefore prevents any leakage of the filling material in case it is in a semifluid condition.

In Fig. 3 I have shown a modification of the cutting and pulling mechanism. In this figure there is shown a series of cutting and pulling members 31, carried by a chain 32 guided on two sprocket wheels. Coöperating with the chain is an abutment 35 made in the form of a small chain carrying blocks traveling at the same speed and in the same direction as the chain which carries the cutting and pulling members. The two chains converge slightly so that the pairs of members approach each other slowly. This mechanism produces a somewhat different shaped piece of candy; the piece being flat on one side and curved on the other side. It will be understood of course that the traveling members move with a speed greater than that with which the shell emerges from the orifice of the nozzle.

While I have referred to this mechanism as cutting and pulling mechanism it will be understood that its chief function is that of pulling, the cutting which in practice is really only indenting, being secondary in importance.

What I claim is:

1. A machine for making candy which consists in means for forming the candy while in plastic condition into tubular form, and means for pulling the tube thus formed down to a tube of less diameter.

2. A machine for making candy which consists in means for forcing candy through an opening while in plastic condition to form a tubular structure and means for pulling the tube thus formed down to a tube of less diameter.

3. The candy making machine which consists in means for forming the candy while in plastic condition into tubular form, means for pulling the tube thus formed down to a tube of less diameter, and means for introducing a filling material into the tube of candy when drawn down.

4. A machine for making candy which consists in means for forcing candy through an opening of a shape to form a tubular structure of a diameter greater than the finished tubular piece, means for pulling the candy down to size, and means for introducing a filling material through the open end of the candy.

5. A machine for making candy which consists of a die having a hole in one portion, a member in said die which projects through said hole and is spaced from the sides thereof to form an annular opening, means for forcing candy through said annular opening to form a tubular structure and means for pulling down said tubular structure to a tube of less diameter.

6. A machine for making candy which consists of a die having a hole at one side, a tubular member projecting through said hole and forming an annular opening, means for pulling down a tube of candy passing through said opening to a tube of less diameter and means for feeding a filler through said tubular member to the tube of candy thus drawn down.

7. A machine for making candy which consists of a die having a hole at one side, a tubular member projecting through said hole, a tube in said tubular member which projects beyond the same to a point at a distance from said annular opening, means for pulling down a tube of candy formed by said annular opening to a tube of less diameter and means for forcing a filling material through the tube which projects through said opening at a distance beyond the same into the tube of candy when pulled down.

In testimony whereof I affix my signature, in presence of two witnesses.

WILLIAM B. LASKEY.

Witnesses:
　JONATHAN T. BROWN,
　GEORGE P. DIKE.